(12) United States Patent
Salokatve et al.

(10) Patent No.: US 7,760,771 B2
(45) Date of Patent: Jul. 20, 2010

(54) OPTICAL FIBER GAIN MEDIUM WITH MODAL DISCRIMINATION OF AMPLIFICATION

(75) Inventors: Arto Salokatve, Tampere (FI); Kalle Ylä-Jarkko, Hämeenlinna (FI)

(73) Assignee: Corelase Oy, Tampere (FI)

( * ) Notice: Subject to any disclaimer, the term of this patent is extended or adjusted under 35 U.S.C. 154(b) by 0 days.

(21) Appl. No.: 11/661,109

(22) PCT Filed: Jul. 27, 2005

(86) PCT No.: PCT/FI2005/000342

§ 371 (c)(1),
(2), (4) Date: Aug. 29, 2007

(87) PCT Pub. No.: WO2006/021609

PCT Pub. Date: Mar. 2, 2006

(65) Prior Publication Data

US 2008/0025363 A1    Jan. 31, 2008

(30) Foreign Application Priority Data

Aug. 26, 2004 (FI) .................................. 20045308

(51) Int. Cl.
*H01S 3/30* (2006.01)
*G02B 6/032* (2006.01)
*G02B 6/036* (2006.01)

(52) U.S. Cl. .......................... 372/6; 385/125; 385/126; 385/127

(58) Field of Classification Search .................. 385/126
See application file for complete search history.

(56) References Cited

U.S. PATENT DOCUMENTS

| 4,549,781 A | * | 10/1985 | Bhagavatula et al. | ......... 385/126 |
| 4,715,679 A | * | 12/1987 | Bhagavatula | ................. 385/127 |
| 5,121,460 A | * | 6/1992 | Tumminelli et al. | ......... 385/126 |

(Continued)

FOREIGN PATENT DOCUMENTS

DE          40 33 768          7/1991

(Continued)

OTHER PUBLICATIONS

International Search Report of PCT/FI2005/000342 mailed Jan. 19, 2006.

(Continued)

*Primary Examiner*—Minsun Harvey
*Assistant Examiner*—Joshua King
(74) *Attorney, Agent, or Firm*—Nixon & Vanderhye P.C.

(57) ABSTRACT

An active multimode optical fiber consisting of a first core section (11), a thin barrier layer (12) material having a thickness (d2) and a lower refractive index than that of the first core section by an index difference (Δn), a second core section (13) having a refractive index equal or higher than that of the first core section, and a cladding (14) having an index lower than that of the first core section. Said index difference and said thickness are selected so that a fundamental core mode couples less strongly with said cladding modes than higher order core modes. A scheme of changing the symmetry of the fiber for reduced sensitivity of the fundamental mode of the first core section to resonance effects.

36 Claims, 9 Drawing Sheets

U.S. PATENT DOCUMENTS

| | | | |
|---|---|---|---|
| 5,892,876 A * | 4/1999 | Desurvire et al. | 385/123 |
| 6,429,963 B1 * | 8/2002 | Berkey et al. | 359/337.2 |
| 6,771,865 B2 | 8/2004 | Blaszyk | |
| 2002/0164140 A1 * | 11/2002 | Lysiansky et al. | 385/127 |
| 2002/0172485 A1 | 11/2002 | Keaton et al. | |
| 2003/0210878 A1 * | 11/2003 | Kumano et al. | 385/127 |
| 2004/0052278 A1 | 3/2004 | Kane et al. | |

FOREIGN PATENT DOCUMENTS

| | | |
|---|---|---|
| EP | 212864 A | 3/1987 |
| EP | 0 851 544 B1 | 6/1999 |
| EP | 1 136 849 A1 | 9/2001 |
| WO | 97/16875 A | 5/1997 |
| WO | WO 00/02290 | 1/2000 |
| WO | WO0002290 A1 * | 1/2000 |
| WO | 03/038486 A | 5/2003 |
| WO | WO03038486 A2 * | 5/2003 |
| WO | 03/077381 A | 9/2003 |
| WO | WO03077381 A2 * | 9/2003 |

OTHER PUBLICATIONS

Payne, "MSc Thesis: An Analysis of W-fibers and W-type Fiber Polarizers," Virginia Polytechnic Institute (2001).

Written Opinion in PCT/FI2005/000342.

* cited by examiner

OPTICAL FIBER GAIN MEDIUM WITH MODAL DISCRIMINATION OF AMPLIFICATION

This application is the US national phase of international application PCT/FI2005/000342 filed 27 Jul. 2005 which designated the U.S. and claims benefit of FI 20045308, dated 26 Aug. 2004, the entire content of which is hereby incorporated by reference.

FIELD OF THE INVENTION

The present invention relates to an optical fiber comprising a first doped core and at least a second undoped core surrounding the first core, said first core having a first refractive index, and said second core having a third refractive index. The present invention also relates to a multimode optical fiber amplifier apparatus for providing optical gain discrimination between the desired fundamental mode and the undesired higher order modes, said amplifier apparatus comprising an active fiber comprising a doped core and at least a second undoped core surrounding the first core, said first core having a first refractive index, and said second core having a third refractive index. The present invention further relates to an optical fiber laser apparatus comprising a resonant cavity including an optical fiber having a doped core and at least a second undoped core surrounding the first core, said first core having a first refractive index, and said second core section having a third refractive index.

BACKGROUND OF THE INVENTION

Development of fiber lasers has shown impressive progress during recent years. Early experiments on fiber lasers were done with active fibers with small core diameters capable of supporting only the fundamental optical mode. With such single mode active fibers output power levels of several hundreds of watts has been demonstrated, putting fiber lasers to the same or above the performance level of other lasers, such as solid state and gas lasers. Demonstrated power levels facilitate a number of materials processing applications for fiber lasers. Apart from continuous wave operation, pulsed operation and pulse amplification with down to femtosecond range pulse widths and peak power well in excess of 100 kW has also been demonstrated with fiber lasers. The preferred need to operate the lasers in fundamental mode leads to the requirement of using relatively small fiber core diameters when using conventional fiber designs, such as step index fibers. The small core area in such fibers, however, starts to limit the achievable power in both continuous wave (=CW) and pulsed fiber lasers and amplifiers. In CW fiber lasers, the upper limit of achievable power is set by the optical damage threshold of the fiber and stimulated Brillouin scattering (=SBS), while in the pulsed fiber lasers or amplifiers the peak power limit is often set by non-linear phenomena in the fiber, such as self-phase modulation and stimulated Raman scattering (=SRS). In order to avoid such power and/or pulse energy limiting mechanisms, one needs to increase the area of the optical field in the fiber. Efforts to do that by simply increasing the core diameter in a conventional step index fiber readily leads to multimode operation and reduced beam quality. The reason to this is that while increasing the core diameter one also must reduce the refractive index step between the core and the cladding materials to keep the fiber single moded. Eventually, manufacturing reproducibility and accuracy for the index step become a limiting factor for making a single-mode step-index fiber when the core diameter is increased beyond a couple of tens of microns. Other solutions to this problem have been developed, one of the most exciting being so called photonic crystal fiber (=PCF), where light confinement in the fiber core is established by making a periodic arrangement of air holes into the fiber that act as mirror. However, PCFs are known to have some drawbacks, namely, they are difficult to manufacture, they are quite sensitive to fiber bending, and also their splicing to conventional fibers is not easy without incurring losses.

Step-index fibers have almost exclusively been used for high power fiber lasers. In such fibers the active material of the core is surrounded by cladding material having a lower refractive index than that of the core. In the so called double-clad fibers an inner cladding material, typically a few hundred microns in diameter is subsequently surrounded by an outer cladding material having a refractive index lower than that of the inner cladding, and that confines the pump light into the inner cladding and makes optical pumping of the core feasible with light having a high numerical aperture. Various schemes have been used to couple the pump light into the active fiber, such as end coupling and side coupling through a pump fiber.

Step index fibers are characterized by a V-number, whose magnitude determines how many stable modes exist in the core of the fiber. V is given by $V=\pi D/\lambda\,NA$, where D is the diameter of the core, $\lambda$ the wavelength, and NA the numeric aperture of the fiber, i.e. $NA=\sqrt{n_1^2-n_2^2}$, where $n_1$ is the refractive index of the core and $n_2$ is the refractive index of the cladding. When $V<2.4$ the fiber supports only a single mode, and it is then called a single-mode fiber. From the definition of V it is easy to see that when the core diameter is increased it is necessary to have a smaller index step $n_1-n_2$ between the core and the cladding in order to keep the fiber single-moded. As an example, with a fiber having a core diameter of 30 µm, an index step of about $2\times10^{-4}$ is needed for single-mode operation at 1 µm wavelength. On the other hand, reliable and reproducible manufacturing of fibers limit the minimum practical index step to a value of about $1\times10^{-3}$. Hence, manufacturing tolerances for the index step become a limiting factor for making a single-mode step-index fiber when the core diameter is increased beyond a couple of tens of microns. Furthermore, the number of stable modes in the core, given roughly as $0.4\times V^2$ for large values of V, increases quadratically as the core diameter D is increased. In large-core fibers there usually therefore exist many modes.

An active fiber used as a gain medium in a laser must not be truly single mode to achieve single mode operation of the laser. The lasing modal characteristics are not only determined by the passive fiber but rather by the net modal gain that depends on modal overlap With the active gain medium and modal losses due to e.g. modal leakage out of the core region. Both of these can be modified with fiber geometry, index profile, and bending or twisting of the fiber. Different fiber geometries, index and doping profiles have been proposed to increase the differential gain between $LP_{01}$ and higher order modes. Some methods rely on changing the confinement of the active-ion doping profile in the fiber core for achieving the highest gain for the fundamental mode, as described in APPLIED PHYSICS LETTERS vol. 74, No. 11, 15 Mar. 1999: Sousa, Okhotnikov—"Multimode Er-doped fiber for single-transverse-mode amplification", or alternatively adjusting the fiber index distributions of the core and cladding regions in order to keep the losses for the fundamental mode low enough as the NA of the core is reduced, as suggested in the U.S. Pat. No. 6,614,975. The problem of these methods is the manufacturability and reproducibility of the structures. The control of the doping profile and the location, width and refractive indices of the surrounding cladding layers is difficult. Alternative approaches exploit methods where significant losses are applied to all but the lowest-order modes. This can be done inducing significant bend loss for the higher order modes by coiling the fiber around a mandrel of suitable size, as described in the U.S. Pat. No. 6,496,301. The purpose of coiling the fiber is to induce significant radiative bend losses to the higher order modes i.e. to other than the fundamental mode. However, for large-core fibers this requires rather small bending radius that, on the other hand, may cause the fiber to break or adversely affects its durability. Alternatively, the loss for the higher order modes can be induced by manufacturing a secondary core of absorber material for absorbing radiation at unwanted modes, as disclosed in the U.S. Pat. No. 5,121,460. In summary, the operation of the coiled fiber amplifier/laser is limited by the manufacturing tolerances of the index step and the tight bending radius, which induces stress on the fiber. The latter approach is limited by the requirement of tight bending radii for large core sizes, which eventually reaches the limit of mechanical reliability or fracture of the fiber.

The U.S. Pat. No. 5,818,630 describes an optical amplification system, comprising: a laser source generating an input beam having a nearly diffraction limited mode; a multi-mode fiber amplifier; a mode converter receiving the input beam and converting the mode of the input beam to match a fundamental mode of the multi-mode fiber amplifier, and providing a mode-converted input beam to said multi-mode fiber amplifier; and a pump source coupled to said multi-mode filter amplifier, said pump optically pumping said multi-mode fiber amplifier, said multi-mode fiber amplifier providing at an output thereof an amplified beam substantially in the fundamental mode. Further in this optical amplification system the multi-mode fiber amplifier comprises a fiber core, wherein a dopant is confined in an area in a central section of the fiber core substantially smaller than a total fiber core area, and wherein mode-coupling into higher-order modes is reduced by gain-guiding. This kinds of systems have been disclosed in earlier publications like OPTICS LETTERS vol. 22, No. 6, Mar. 15, 1997: Taverner, Richardson, Dong, Caplen, Williams, Penty—"158-µJ pulses from a single-transverse-mode, large-mode-area erbium doped fiber amplifier".

Publication WO-00/02290 describes an optical fibre having a cladding layer surrounding a core, the cladding layer comprising at least a first, relatively inner region, a third, relatively outer region, and a second region disposed between the first and third regions, the second region having a higher refractive index than the first and third regions; wherein the peak difference in refractive index between the first cladding region and the core is less than about 0.0030, or less than about 0.0025, or preferably less than about 0.0015. Accordingly, here is used the knowledge that the core diameter can be enlarged and hence the energy density therein can be reduced by lowering the refractive index difference between the energy transmitting core and the non-transmitting cladding. The core of the fibre according to the publication consists of a low numerical aperture central region that is doped with the active atoms and exhibit a refractive index dip, which central region is surrounded by an outer ring that is undoped with the active atoms and has a considerably higher refractive index than the central region. The fibre has a relatively large "multimode" core, which is operating in a single mode by the influence of the placement of the dopant, i.e. this property is achieved by the difference between the central region of the core and the outer ring of the core.

SUMMARY OF THE INVENTION

The main object of the invention is to attain an active optical fiber where the fundamental limitation of core diameter for single mode operation of a fiber laser or an amplifier can be extended to larger values of diameter, but yet keeping the refractive index steps within the fiber large enough for not to sacrifice its manufacturability.

According to the main aspect of the invention it is provided an active multimode fiber for a gain medium in fiber lasers or fiber amplifiers, comprising: a first core section doped with active atoms, and having a first effective refractive index; at least a second core section undoped with said active atoms, surrounding said first core section, and having a third effective refractive index that is equal or greater than said first effective refractive index; at least a cladding surrounding the second core section, said cladding having a fourth refractive index that is smaller than said first effective refractive index thereby forming a refractive index step in a boundary. Said active fiber further comprises a barrier layer between said first core section and said second core section, the barrier-layer having: a second refractive index that is smaller than the first effective refractive index of the first core section by an index difference, and a thickness; and at, least said first effective refractive index and said third effective refractive index are selected to enable core modes with a first propagation constant in said first core section, and cladding modes with a second propagation constant, in said second core section, said first propagation constant and said second propagation constant having values approaching each other, and said second core section has a cross-sectional area that is large enough to occupy a multitude of modes; whereupon said index difference and said thickness are selected so that a fundamental core mode couples less strongly with said cladding modes than higher order modes.

Accordingly, the result is achieved with an unconventional index profile where the second core section has an equal or higher effective refractive index, than that of the first core section and where these two regions or sections are separated by a barrier layer having a refractive index smaller than that of the first core section. In such a fiber two groups of modes exist, and resonance effects play an important role in coupling between the modes of those groups.

According to the second aspect of the invention it is provided an optical fiber laser apparatus comprising: a resonant cavity including a multimode optical fiber having a first core section doped with active atoms, and at least a second core section undoped with said active atoms, surrounding the first core section; said first core section having a first effective refractive index, and said second core section having a third effective refractive index that is equal or greater than said first effective refractive index, at least a cladding surrounding the second core section, said cladding having a fourth refractive index that is smaller than said first effective refractive index; a pump source of radiation for excitation of the active atoms in the fiber gain medium, and means of extracting laser light out of said resonant cavity. Said fiber laser apparatus further comprises: a large enough cross-sectional area of said second core section to occupy a multitude of modes therein; and a barrier layer in said fiber between the first core section and the second core section, said barrier layer having a thickness and a second refractive index, which is smaller than the first effective refractive index of the first core section, whereupon a less strong coupling between a desired fundamental core mode and undesired higher order core modes is achieved by following: said thickness and an index difference between the second refractive index and the first effective refractive index are selected so that a fundamental core mode couples less strongly with the cladding modes than higher order core modes do; core modes with a first propagation constant are enabled in the first core section for transmission of one portion of the total power, and cladding modes with a second propagation constant are enabled in the second core section for transmission of another portion of the total power; and the core modes and the cladding modes occupy the same region of propagation constant space.

According to further aspects of the invention said barrier layer in the fiber is either eccentrically positioned between said first core section and said second core section and/or has an unsymmetrical cross section so that said barrier layer has a variable thickness, for instance a smallest thickness at one side of the first core section and a greatest thickness at the opposite side of the first core section. This is especially practical in case when the optical fiber is coiled, i.e. is bent to have curvature, whereupon said smallest thickness and said greatest thickness are in a bending plane extending through the longitudinal centerline of the first core section. The bending radius of the coil is selected to have such a value that fundamental core mode is non-resonant in the optical fiber to incur gain discrimination between fundamental and higher order core modes. This bending together with asymmetrical configuration of the optical fiber enable very precise control and adjustment of the discrimination in the final product, i.e. weak coupling of the fundamental core mode with the cladding modes, but strong coupling between the higher order core modes and the cladding modes.

The novel fiber according to the present invention enables one to design a laser where the fundamental mode has the highest gain, and lowest threshold for lasing. This is accomplished by bending the fiber and modifying the fiber geometry in order to control the resonances and modal resonances.

DETAILED DESCRIPTION OF THE INVENTION

Figure 1A:
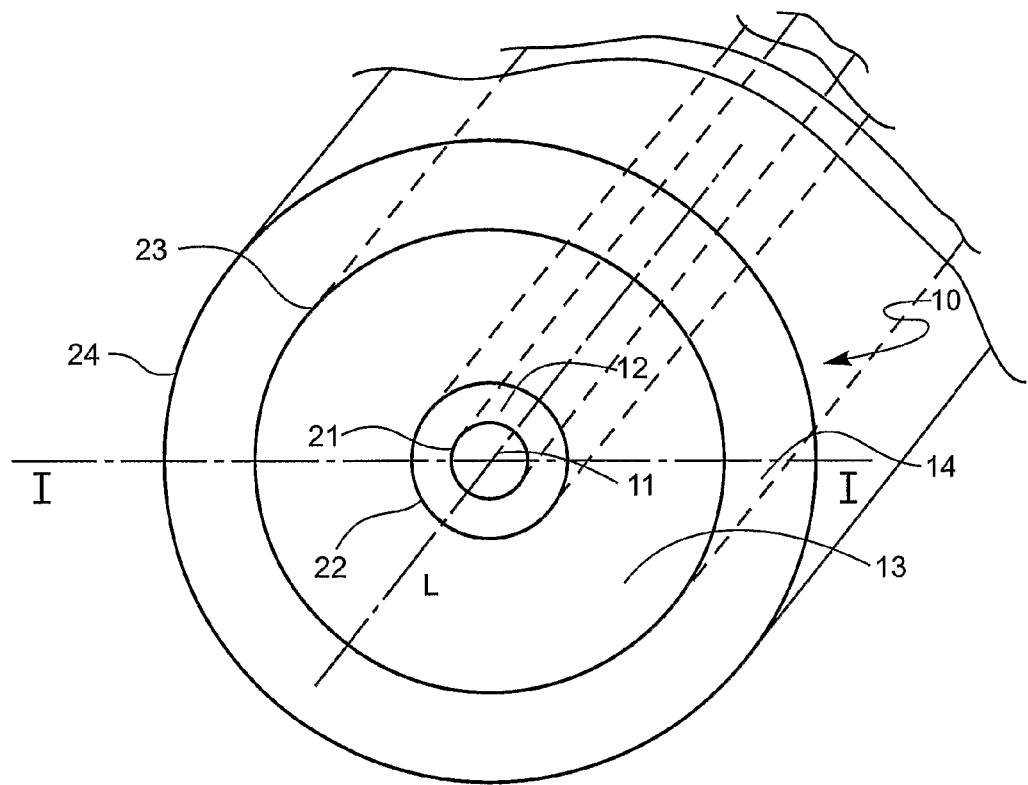
FIGS. 1A and 1B illustrate schematically the structure of the optical fiber according to the first embodiment of the invention in axonometric of the fiber, and depicts a refractive index profile of this optical: fiber respectively in the radial direction I-I thereof. In this first embodiment the structure of the optical fiber is co-axial with circular cross-sectional form of the core sections, the barrier layer and the cladding.
Figure 1B:
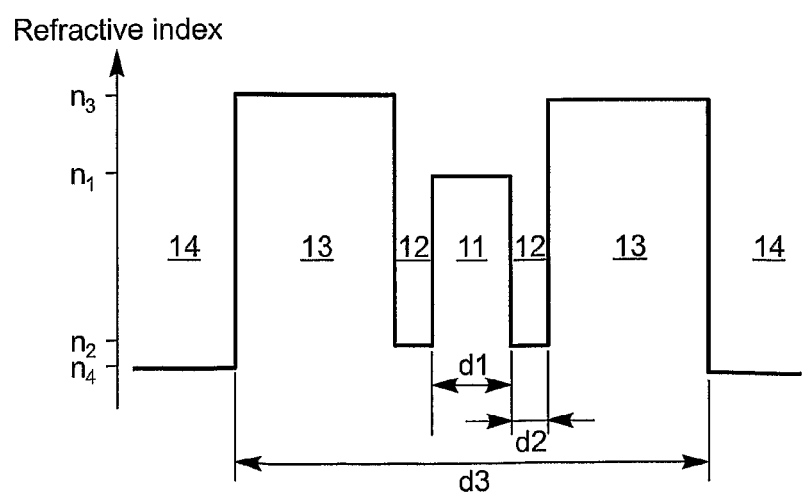
Figure 6A:
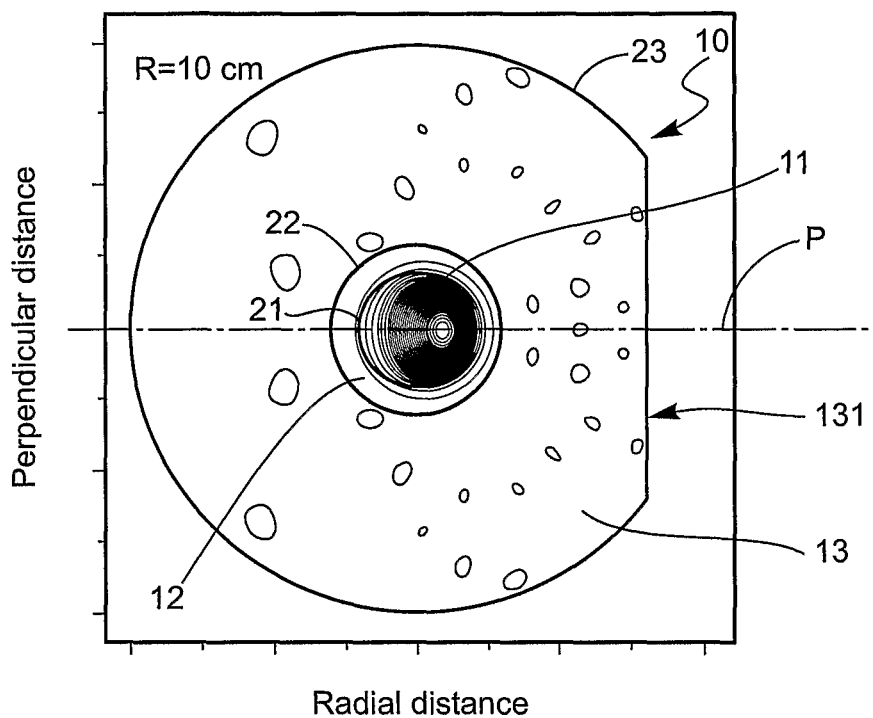
FIGS. 6A and 6B depict a contour plot of modal field of a fiber according to a second embodiment of the invention in cross-section of the fiber, and a line plot along radial direction III-III of the contour plot respectively. In this second embodiment the structure of the optical fiber is concentric with circular cross-sectional form of the first core section and the barrier layer, but with a cross-sectional form having a cut-away segment of the second core section.

Starting with a circularly symmetric fiber cross-section, and referring now to FIG. 1A, a first example embodiment of an optical fiber 10 according to the present invention will be illustrated. The optical fiber 10 consists of a doped first core section 11 with a first effective refractive index $n_1$, a barrier layer 12 with a second refractive index $n_2$, a second core section 13 with a third effective refractive index $n_3$, and a cladding 14 with a fourth refractive index $n_4$. The first boundary 21 between the first core section and the barrier layer, the second boundary 22 between the barrier layer and the second core section, the third boundary 23 between the second core section and the cladding, and the fourth boundary 24 between the cladding and further coating are also denoted in FIG. 1A. FIG. 1B shows the refractive index profile for a symmetrical and straight optical fiber 10 according to FIG. 1A along any line that runs through the center of the fiber 10. Essential to the refractive index profile of the fiber according to the present invention is that the effective index $n_3$ of the second core section 13 is equal or higher than that $n_1$ of the first core section 11, and that the refractive index $n_4$ of the cladding 14 is smaller than the effective index $n_1$ of the first core section 11. Hence, the indices satisfy the relations $n_1<n_2$, $n_3 \geq n_1$, and $n_4<n_1$. The first core section 11 of the fiber 10 is doped with active atoms, such as erbium (=Er), neodymium (=Nd) or ytterbium (=Yb), to provide gain in the laser or amplifier by optical excitation or pumping of those atoms. Accordingly, in this first embodiment the doped first core section 11, the barrier layer 12, the undoped second core section 13, and the cladding 14 are each circular and co-axial. The second embodiment as shown in FIG. 6A is quite similar having first core section 11 and the barrier layer 12 with circular cross-sections, but the second core section 13 has a flat side 131 extending in the longitudinal direction of the fiber 10, i.e. the third boundary 23 has a cut-away segment, the rest portion of the third boundary 23 being circular. The bending plane P that goes through the common center of the circular first boundary 21 and the circular second boundary 22 is also shown. Bending of the optical fiber 10 is discussed more detailed later in this text.

Figure 7:
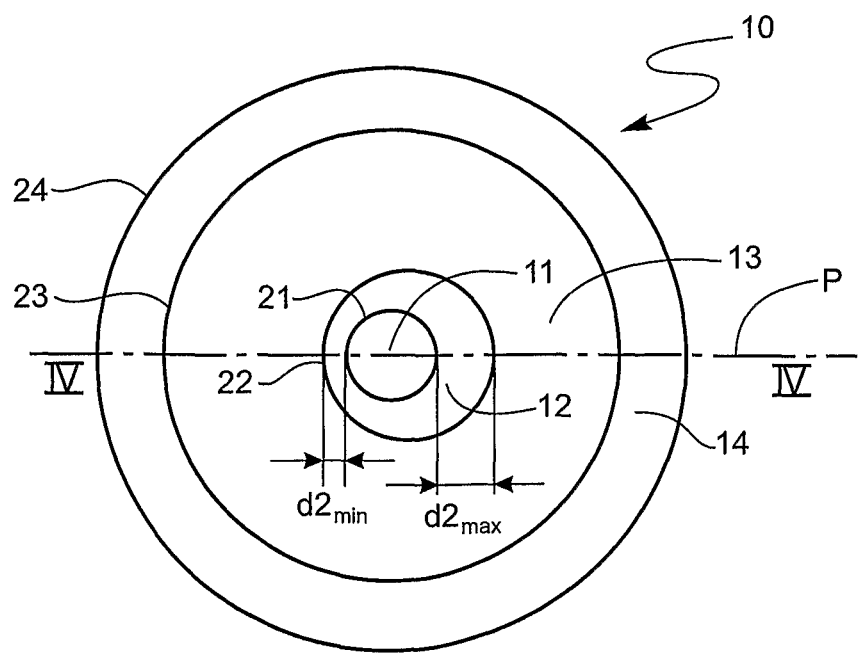
FIG. 7 illustrates schematically the structure of the optical fiber according to the third embodiment of the invention in cross-section of the fiber. In this third embodiment the structure of the optical fiber is eccentric with circular cross-sectional form of the core sections, the barrier layer and the cladding.
Figure 11A:
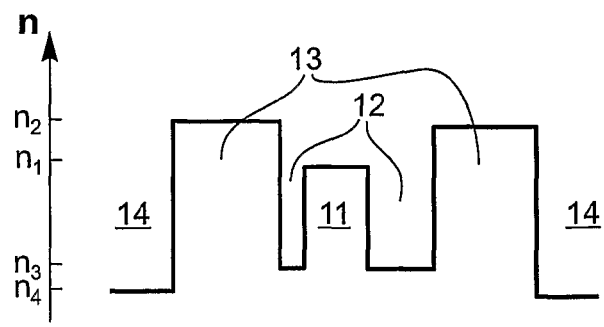
FIGS. 11A and 11B depict the refractive index profile along a transversal direction IV-IV through the center of the fiber of FIG. 7 when the fiber is straight, and the transformed refractive index profile of the same when said fiber is bent respectively, as a function of the radial distance from the bend axis.

The third embodiment as shown in FIG. 7 is also quite similar having a doped first core section 11, a barrier layer 12, an undoped second core section 13, and a cladding 14 all with circular cross-sections, i.e. the boundaries are circular. Here the first boundary 21, the third boundary 23 and fourth boundary 24 are concentric, but the barrier layer 12 is asymmetrically positioned around to the first core section 11, whereupon the second boundary 22 is not concentric. The bending plane P that goes through the centers of the circular first, second, third and fourth boundaries is also shown. As can be seen, the thickness of the barrier layer 12 is smallest $d2_{min}$ at one side of the first core section 11 and greatest $d2_{max}$ at the other side thereof, when measured along the bending plane P. The refractive index profile of this asymmetrical optical fiber 10 when in straight state is shown in FIG. 11A, and along the bending plane P. In the disclosed asymmetrical fibers at least the barrier layer 12 has variable thickness d2 along the periphery thereof, i.e. thicker and thinner sections.

Figure 8:
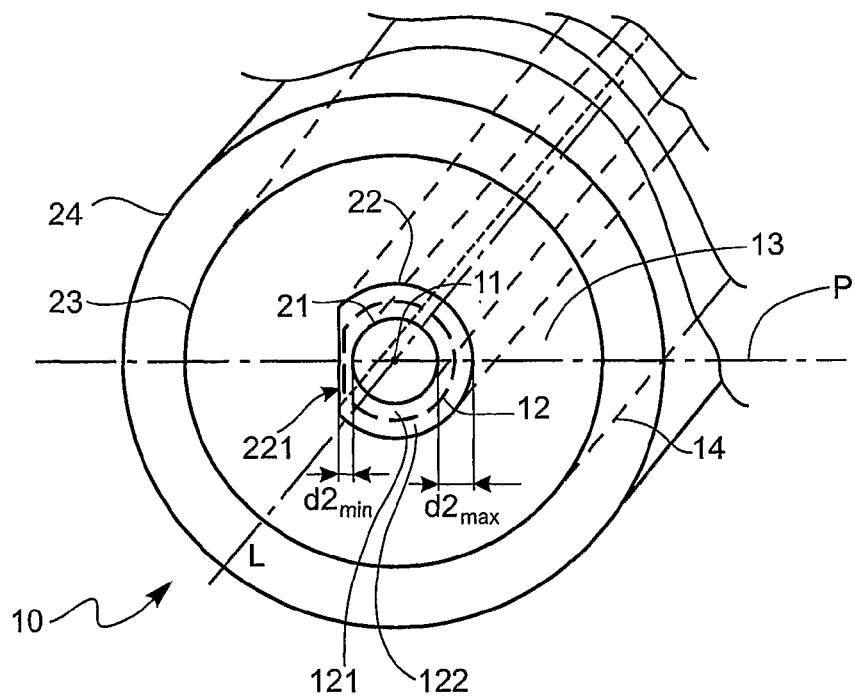
FIG. 8 illustrates schematically the structure of the optical fiber according to the fourth embodiment of the invention in axonometric view. In this fourth embodiment the structure of the optical fiber is concentric with circular cross-sectional form of the core sections and the cladding, but with a cross-sectional form having a cut-away segment of the barrier layer.

Further, the fourth embodiment as shown in FIG. 8 is quite similar, too, comprising a doped first core section 11, a barrier layer 12, a second core section 13, and a cladding 14, in which fiber 10, the first core section 11, the second core section and the cladding 14 have circular cross-sections, i.e. the boundaries are circular. In this case the barrier layer 12 is symmetrically located with respect to the first core section 11, the second core section 13 and the cladding 14, more specifically the circular portion of its second boundary 22, the first boundary 21, the third boundary 23 and the fourth boundary 24 are concentric, but the second boundary 22 has a flat side 221 extending in the longitudinal direction of the fiber 10, i.e. the second boundary 23 has a cut-away segment. The bending plane P that goes through the common center of the boundaries is also shown. Just like in FIG. 7 the thickness of the barrier layer is smallest $d2_{min}$ the at one side of the first core section 11 and greatest $d2_{max}$ at the other side thereof, when measured along the bending plane P.

Figure 9:
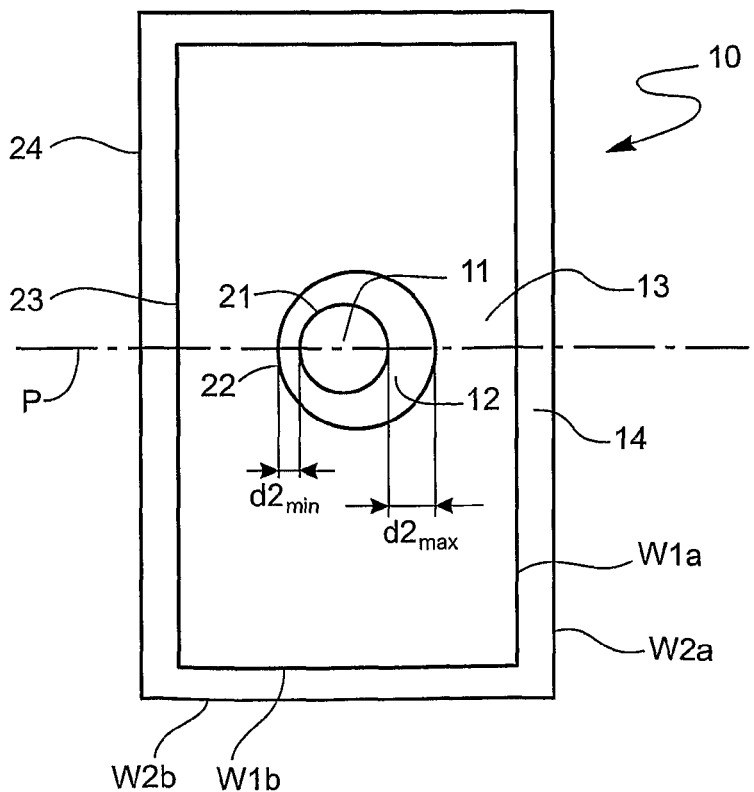
FIG. 9 illustrates schematically the structure of the optical fiber according to the fifth embodiment of the invention in cross-section of the fiber. In this fifth embodiment the structure of the optical fiber is such that the barrier layer is eccentric in respect to the core section, the inner first core section being circular, but the outer second core section together with the cladding are rectangular and concentric in respect to each other. This embodiment contributes bending of the fiber in the desired direction.
Figure 10:
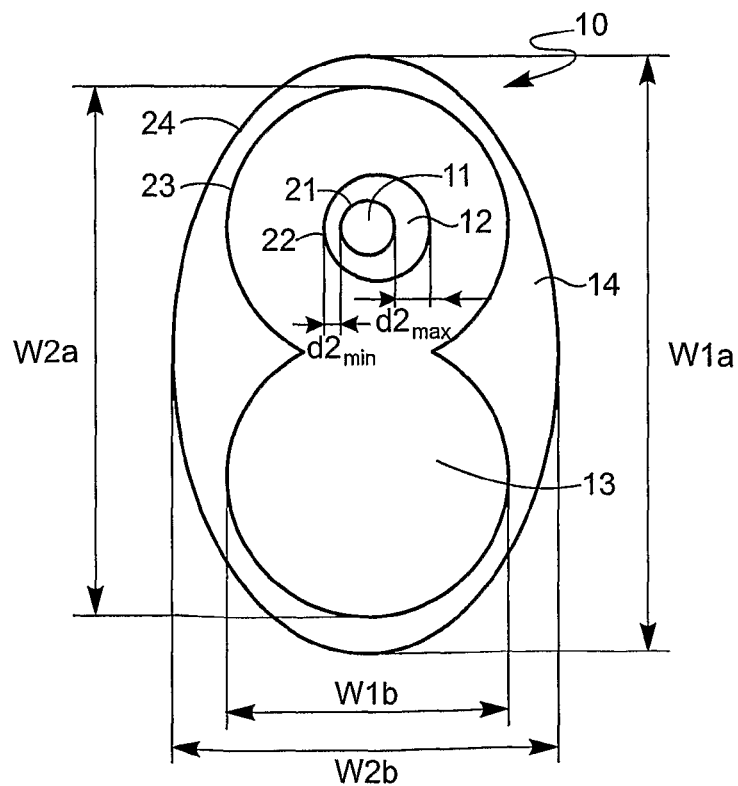
FIG. 10 illustrates schematically the structure of the optical fiber according to the sixth embodiment of the invention in cross-section of the fiber. In this sixth embodiment the structure of the optical fiber is such that the single outer second core section has a main segment, the barrier layer and the inner first core section being eccentric therein, and a parallel segment without first core section and barrier layer, whereupon the main and parallel segment has a shallower common area. The oval cladding symmetrically surrounds the outer second core section. This embodiment contributes bending of the fiber in the desired direction, too.

The fifth embodiment as shown in FIG. 9 deviates more from those embodiments discussed above. In this embodiment the optical fiber 10 comprises a doped first core section 11 with a first effective refractive index $n_1$ and a circular first boundary 21, a barrier layer 12 with a second refractive index $n_2$, and a circular second boundary 22, an undoped second core section 13 with a third effective refractive index $n_3$, but having a rectangular third boundary 23, and a cladding 14 with a fourth refractive index $n_4$ and a rectangular fourth boundary 24. The doping and undoping as well as the refractive indices are like in the other embodiments of the invention. In this case, the first core section 11 is centered and the barrier layer 12 is asymmetrically positioned like in embodiment of FIG. 7, and the bending plane P goes through the centers of their circular boundaries 21, 22. The bending plane P is arranged perpendicular to the longer widths W1$a$, W2$a$ of the second core section and the cladding, whereupon the shorter widths W1$b$, 2$b$ of the second core section and the cladding are parallel with the bending plane P. First of these widths W1$a$, W1$b$ as well as second of these widths W2$a$, W2$b$ can be sides, as shown in FIG. 9, or diametral dimensions, as shown in FIG. 10. This configuration makes the fiber easily bendable around an axis perpendicular to the bending plane. Thus, this fiber will naturally bend in the desired direction as will be explained later.

In the optical fiber of the sixth embodiment shown in FIG. 10 the doped first core section 11 with the circular first boundary 21, the barrier layer 12 with the circular second boundary 22 are arranged just as in the embodiments of FIGS. 7 and 9, but the undoped second core section 13 has a double circular configuration, like a number "8", i.e. the third boundary 23 is formed by two intersecting circles, the connecting line between the centers of these two circles being perpendicular to the bending plane P that goes through the centers of the circular boundaries 21, 22 of the first core section and the barrier layer. The cladding 14 surrounds this double circular third boundary 23, and can have flat rectangular fourth boundary, like in FIG. 9, or substantially elliptical fourth boundary 24, like in FIG. 10, or a fourth boundary formed by two half-circles connected by direct lines. This configuration, too, makes the fiber easily bendable around an axis perpendicular to the bending plane. Thus, this fiber will naturally bend in the desired direction as will be explained later.

By the effective refractive index of a core section we mean that for a given core section a propagation constant $\beta$ is first solved for the fundamental mode, and the effective index n is then calculated from $n=\beta/(2\pi/\lambda_0)$, where $\lambda_0$ is the vacuum wavelength of radiation of interest which is generally the operating wavelength of the laser or optical amplifier the active fiber is part of. The propagation constant $\beta$ of a waveguide or core section describes the sinusoidal variation of optical fields along the propagation direction of radiation, and it is inversely proportional to the wavelength of said sinusoidal variation. It is a unique number for a given core geometry, optical mode and index profile. Thus, the effective index, as defined in this text, is also a well defined number for a given core section, and it incorporates the possible refractive index variations or profiles within the cross-section of the core section in question. Although in this text the refractive indices are dawn to be constant within each region, non-constant refractive index profiles due to manufacturing issues generally result in a practical fiber, but they are also included in the scope of the present invention through the definition of the effective refractive index. Likewise, non-constant index profiles of a core section that are intentionally introduced, e.g. due to non-uniform doping, are also included. Accordingly, the first core section 11 and the second core section 13 have above mentioned effective refractive indices $n_1$ and $n_3$. For the barrier layer 12 and for the cladding 14 the propagation constant is undefined and irrelevant, and so here the simple refractive indices $n_2$ and $n_4$ are valid.

For those skilled in the art it is obvious that the refractive index profile of the fiber 10 leads in general to two groups of optical modes that are guided by the fiber. The first group consists of modes whose intensity is mainly concentrated in the first core section 11. In this text we shall call this group of modes as the core modes. Due to the doping of the first core section 11 by active atoms, these modes experience gain when propagating in an active fiber of a laser or an amplifier. The other group of modes consists of modes whose intensity is mainly concentrated in the second core section 13, those modes are here called as the cladding modes. The cladding modes experience minimal gain in an active fiber because the second core section 13 is not doped with active atoms. The barrier layer 12, as its name suggests, is a region that spatially separates the first core section and cladding modes. In the region of the barrier layer 12 the solutions of the Maxwell's equations for the core modes are given by linear combinations of the two Hankel functions, and in this region the fields of the core modes can be described as evanescent fields. In quantum mechanics the evanescent fields are generally related to tunneling through a barrier layer, and due to this analogy the region 12 is here called the barrier or barrier layer. The barrier layer 12 is not necessarily a single layer but it may also contain more than one layer, in which case these are called as stratum/strata 121, 122 having different second refractive indices $n_{2A}$, $n_{2B}$ that together form the barrier layer 12. The thickness of the barrier layer is, for example, from 3 to 50 μm, preferably between 5 and 20 μm. The guided optical modes of the first and at least the second core sections are coupled—inter-core coupling—significantly to each other provided that the geometrical dimensions and refractive index of the barrier layer are appropriately chosen to enable substantial overlap of core modes and the cladding modes. According to this invention said coupling should be maximized for all modes except the fundamental mode of the first core section.

One possibility for maximizing the coupling is the radial dimensioning of the barrier layer. The degree of overlap between the core and the cladding modes can be varied by varying the thickness d2 of the barrier layer 12 and/or the index difference $\Delta n = n_1 - n_2$. For instance, with a given index difference $\Delta n$, increasing the thickness d2 of the barrier layer 12 will lead to smaller overlap which means that a smaller fraction of the power of the core modes is propagating in the second core section 13, and smaller fraction of the power of the cladding modes is propagating in the first core section 11.

Another possibility for maximizing the coupling is the propagation constants. Since the refractive index $n_3$ of the second core section 13 is equal or higher than the refractive index $n_1$ of the first core section 11, there are cladding modes whose propagation constants $\beta_2$ are very close to those of the core modes $\beta_1$, provided that the cross-sectional area of the second core section 13 is large enough to occupy a multitude of modes. In practical fibers this requirement can be easily met. The fact that for a given core mode there exists a cladding mode whose propagation constant is very close to that of the core mode, i.e. $\Delta\beta = \beta_2 - \beta_1$ is small, will lead to coupling of these two groups of modes by the small irregularities in the refractive index profile or geometry along the length of the fiber. The coupling strength of any core and cladding mode also depends on the spatial overlap between these two modes. The examples for the relative magnitudes of the effective indices discussed above are given for an optical fiber 10 having the cross-sectional area of the first core section 11 significantly smaller than that of the second core section 13. In this preferred case the allowed values for propagation constants $\beta_2$ of the second core section 13 are much more densely distributed that the propagation constants $\beta_1$ of the first core section 11. In other words, the average spacing of propagation constants $\Delta\beta_2$ of the modes of the second core section 13 is significantly smaller than the respective spacing $\Delta\beta_1$ of the modes of the first core section 11. This makes the fulfillment of the mentioned requirement for overlapping propagation constants with very small propagation constant mismatch easy to achieve in practice, and also favors fast power diffusion between the optical modes of the second core section. As a further note we should mention that we are generally only interested in the fundamental and a few closest lying higher order modes of the first core section, since usually only they play a significant role in the operation of fiber lasers and amplifiers. It is those lowest order higher order modes that tend to compete with the fundamental mode in lasing, and thus to deteriorate the beam quality of a laser. Thus, we are interested in any schemes that will significantly discriminate out the lasing in those lowest order higher order modes, and hence favor lasing only in the fundamental mode. The same applies to fiber amplifiers when the word "lasing" is replaced by "optical amplification".

As previously discussed, the overlap, and hence the modal coupling strength, can be controlled with the barrier layer 12 via the evanescent field coupling through it. Different core modes couple with different strengths with the cladding modes. When $\Delta n$ and d2 are properly chosen, one can reach a situation where the fundamental core mode couples significantly less strongly with the cladding modes than the higher order core modes do. Hence, the material of the barrier layer 12 acts as a leakage path for the core modes as far as the modal gain in the active fiber is concerned. Note, however, that this is not leakage out of the fiber in toto, since the light is still guided by the fiber.

In general, the optical fiber 10 will support multiple core modes provided that the first core section diameter is relatively large, for instance a few tens of μm, and the index step $\Delta n$ is large enough to produce V-number larger than 2.4. In this respect the core modes resemble those of a conventional step index fiber having similar dimensions and index steps. However, even though supporting multiple core modes, the net modal gain of the active fiber 10 used in a fiber laser or amplifier can be controlled through the thickness, geometry and the refractive index of barrier layer 12, and the net gain for different modes may be designed so that the fundamental core mode has the lowest threshold gain for lasing. Hence, although the fiber first core section 11 is not single-moded, the laser will operate in single-mode or close to single-mode fashion provided that the index profile and layer thicknesses of fiber 10 are properly chosen. The net gain for the core modes coupling strongly with cladding modes will be smaller than for those that couple weakly, because when a photon propagates in a cladding mode it does not experience significant gain due to the very small overlap of the cladding mode field with the doped first core section 11. The thickness and refractive index of barrier layer 12 can be chosen so that only the fundamental core mode will have enough net gain for lasing. In practical implementations of the present invention the thickness d2 of the barrier layer 12 of the fiber 10 is typically from 3 to 50 μm, preferably from 5 to 20 μm.

Figure 2:
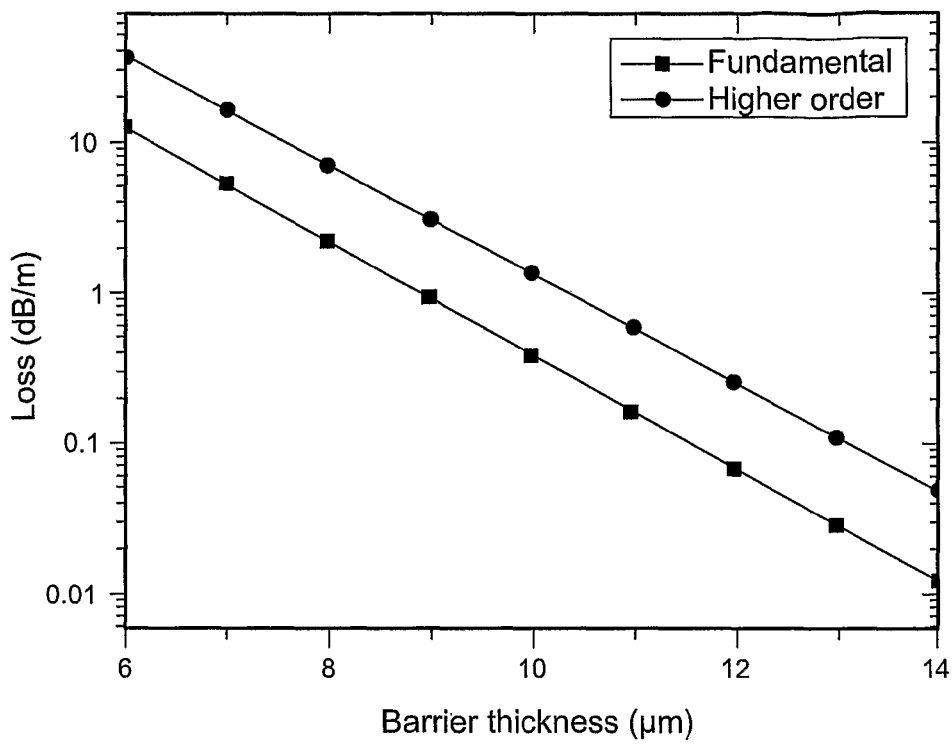
FIG. 2 illustrates the fundamental and higher order mode losses due to energy leakage from the first core section into an infinite second core section through the barrier according to the invention.

A first order approximation to the leakage loss can be obtained by assuming that the second core section 13 is of infinite extent, and by calculating the complex propagation constants for the core modes. The imaginary part of a complex propagation constant is then related to the radiation loss of a core mode. Referring now to FIG. 2, the loss for the fundamental core mode and the first higher order core mode has been plotted as a function of thickness of barrier layer 12. An index step $\Delta n=2\times10^{-3}$, and diameter of the first core section 11 of 40 μm have been used in the calculation. The loss expressed in dB/m for the fundamental mode is about by a factor of 3.4 smaller than that for the higher order mode. Such a difference in loss is sufficient to favor lasing in the fundamental mode in a fiber 10 when used as an active lasing medium, even though the first core section supports multiple modes. It should be stressed that the loss mentioned in the context of the fiber of the present invention is not really radiative loss out of the fiber, but rather gain reduction of a core mode due to interaction with the cladding modes. In practical implementations of the present invention the diameter of the first core section 11 of the fiber 10 is advantageously from 10 to 100 μm, preferably from 30 to 60 μm.

Figure 3:
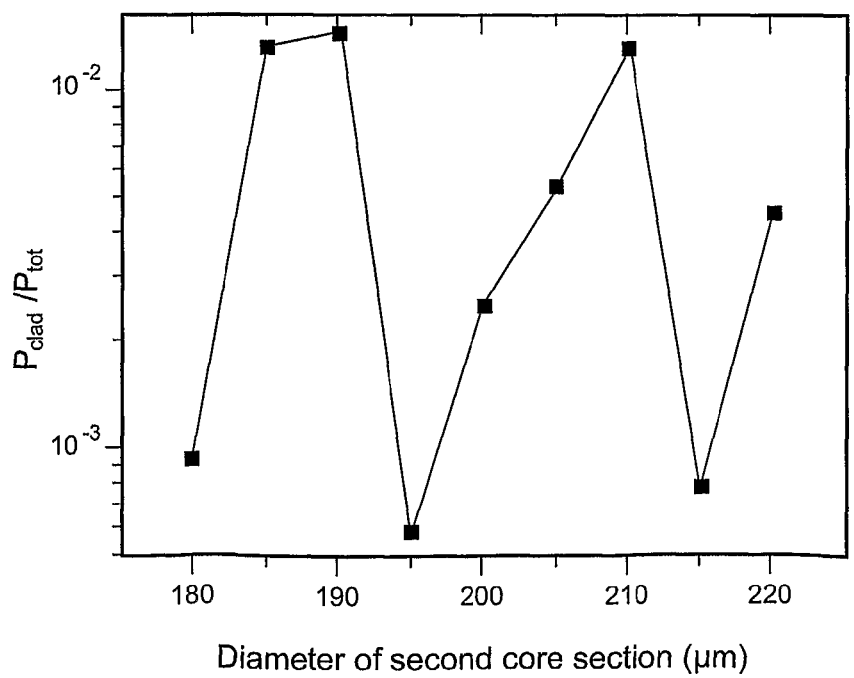
FIG. 3 depicts the ratio of power in the second core section to total power for the fundamental core mode as a function of second core section diameter.

In a conventional step-index fiber the refractive index of the first core section is higher than that of the cladding, and hence the fields of the core modes have an exponentially decaying tail in the cladding material. In the fiber 10 of the present invention, the fields of the core modes in the region of second core section 13 do not have an exponentially decaying behavior but are oscillatory. The fields of the core modes of fiber 10 therefore feel the refractive index step at the boundary 23 between the second core section and the cladding, where the boundary conditions for the fields must be satisfied. In FIG. 3 the ratio between power flowing in the second core section and total power flow is plotted for the fundamental core mode as a function of second core section diameter for a straight fiber. Clear resonances are seen in this plot, indicating that the coupling of the fundamental core mode of fiber 10 with the cladding modes depends on the thickness of second core section. The occurrence of such resonances cannot be avoided in practice due to fiber thickness manufacturing tolerances, which are about 5%.

Figure 4A:
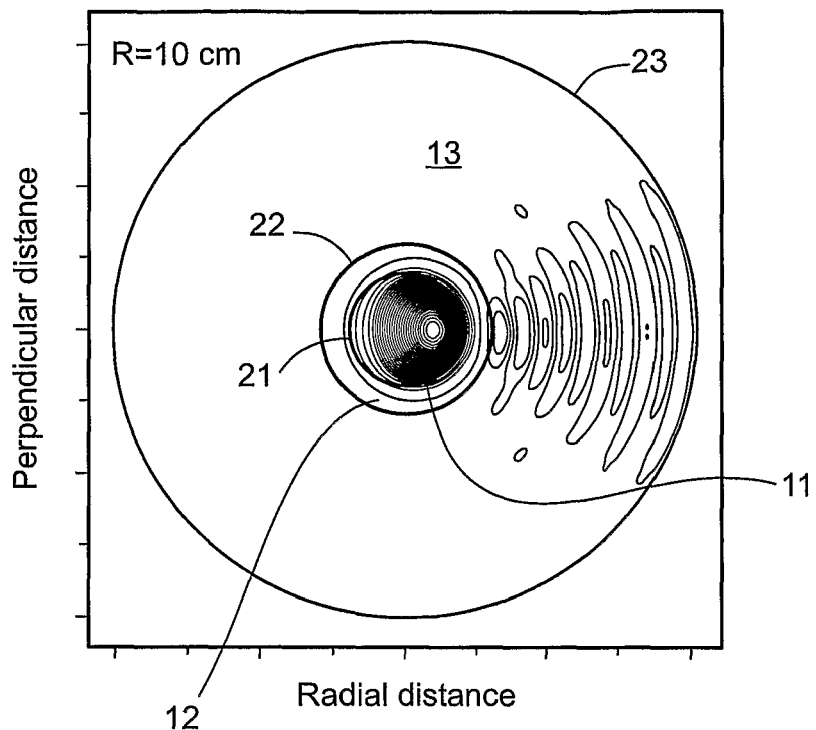
FIGS. 4A and 4B depict a contour plot of modal field of a fiber according to the first embodiment of the invention shown in cross-section of the fiber, and a line plot along the radial direction II-II of the contour plot respectively.
Figure 4B:
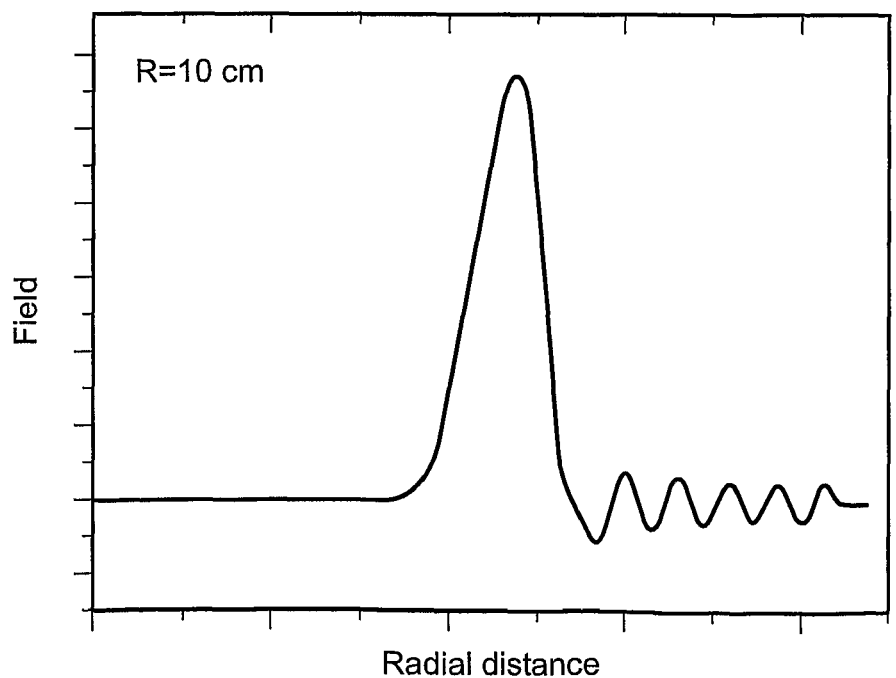
Figure 15:
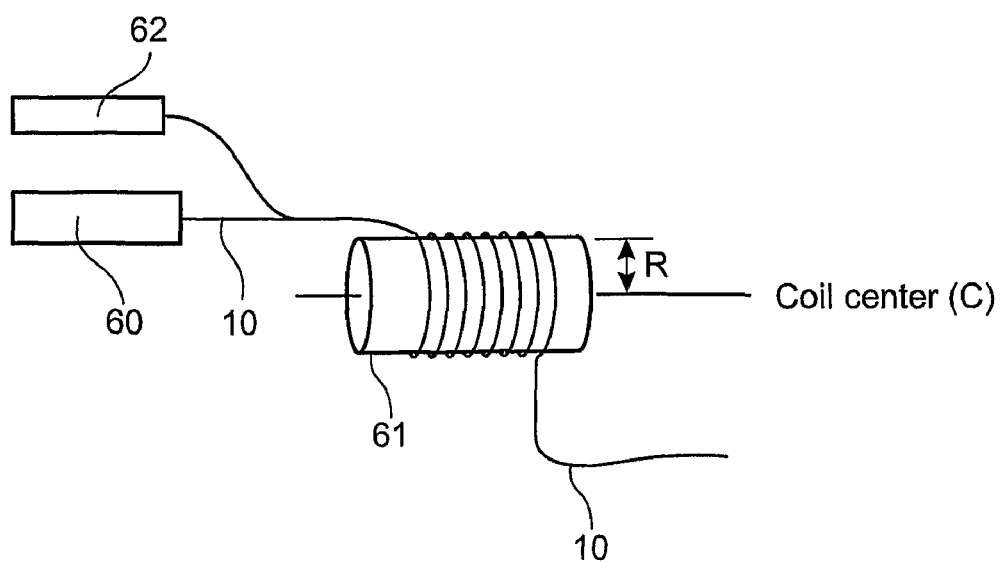
FIG. 15 depicts schematically an example of a multimode optical fiber amplifier apparatus according to the present embodiment, where the active optical fiber is bend around a sleeve, seen from outside.

In practical fiber lasers and amplifiers the active fiber is not straight but usually wound or bent into a coil 61 of radius R for convenience of handling and packaging, as shown in FIG. 15. The bending radius is not necessarily constant through the coil but it can also have a varying radius R, which can be attained by using conical coil or e.g. elliptical coil, whereupon the resonances average over locally different radii. In the figures the bending plane P is the symmetry plane of the cross-section of the optical fiber 10, or at least the symmetry plane of the first and second core sections, the barrier layer and the cladding, and further the radius R is in this bending plane P. The bending direction is such that the thicker $d2_{max}$ side of the barrier layer have larger radius, i.e. gentle curvature, and the thinner $d2_{min}$ side of the barrier layer have smaller radius R, i.e. tight curvature, as visible from FIG. 11B. In addition to that, the cross section of the coil need not be a circle but it can also be elliptical, for example. The winding process will produce distortions or changes of the spatial modal profiles, the distortions being the more severe the smaller the bending radius R of the fiber coil. For a bent-fiber a simple light ray propagation model can qualitatively explain how the light tends to pack towards the outer edge of the fiber in the coil, a phenomenon somewhat akin to a centrifugal force in classical mechanics. Resonance effects, as described above for a straight fiber according to this invention, occur also for the same fiber when it is wound into a coil and when the radius of the coil R is varied. FIG. 4A shows a contour plot for the field of the fundamental core mode at R=10 cm, where a strong resonance of a core mode field inside the second core section exists. FIG. 4B further shows a line plot of the field along the direction of bending radius through the center of the fiber. This plot shows the relatively strong oscillatory fields in the second core section. In such case strong coupling of the fundamental core mode with the cladding modes is expected. Note that the higher order core modes would not necessarily show a resonance at this particular bending radius, and hence the fundamental core mode would have higher leakage losses than the higher order modes.

Apart from bending the fiber, another possibility to control the resonances of the fiber by mechanically modifying it is twisting the fiber or using a combination of bending and twisting, for example.

Figure 5:
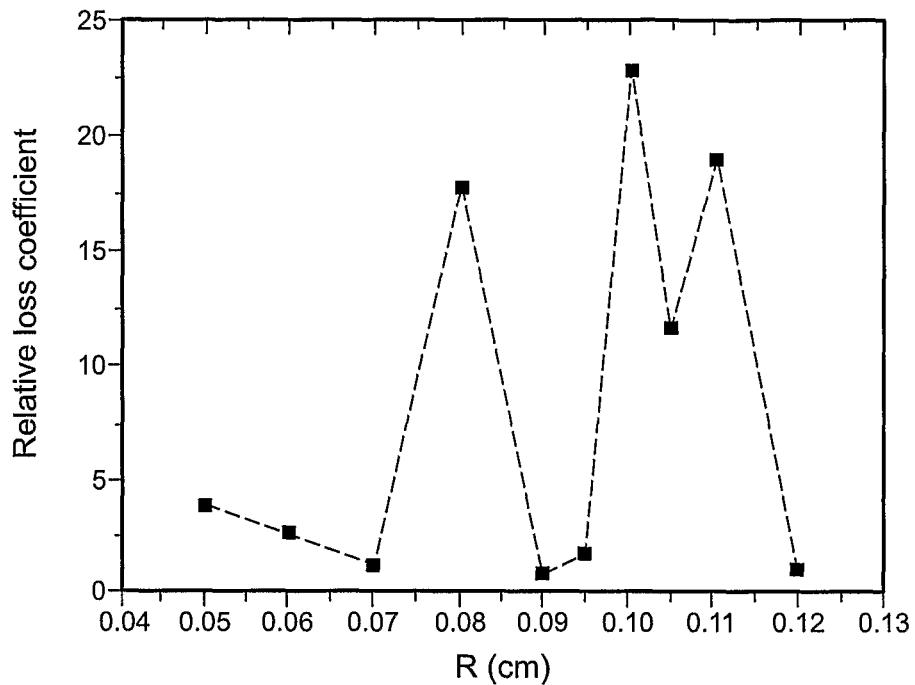
FIG. 5 depicts the relative loss of a fundamental core mode as a function of bending radius R, when the fiber according to the first embodiment of the invention is bent as shown in FIG. 15.
Figure 11B:
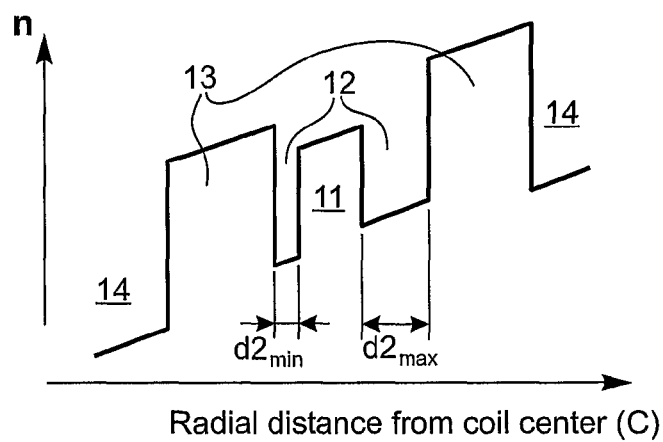

FIG. 5 shows the relative power flow in the second core section as a function of R for the fundamental core mode. It is evident that there are resonances as R is varied, for instance at R=8 cm and 10 cm. In the case of the fiber 10 of the present invention the resonances therefore make the losses of core modes behave dynamically as R is varied. While the resonance for the fundamental core mode can be avoided by choosing an appropriate coiling radius R, it is preferable in addition to modify the geometry of the fiber structure to further minimize the resonance effects for the fundamental core mode. The radius R of the coil is advantageously from 3 to 50 cm, preferably from 5 to 20 cm. In general, when fiber 10 is bent into a coil the effective refractive index profile changes along the bending radius as shown in FIG. 11B. Bending forces the fields of the optical modes of the first core section 11 to concentrate towards the outer edge of the core, i.e. at larger radial distance from the bend axis. This effect is larger the smaller the bending radius. This means that the bending produces an effective confinement for an optical mode at the inner edge of the waveguide, while at the outer edge the opposite is true, i.e. bending tends to push the mode out of the waveguide. Hence, it is evident that larger mode confinement due to the intrinsic refractive index profile at the outer edge compared to that at the inner edge is preferred. This can be accomplished by making the thickness of the barrier layer 12 smaller at the inner edge compared to that at the outer edge of the first core section.

What is important to notice in this invention is that the effectiveness of the bending induced mode confinement is dependent on the spatial field profile of the mode of the first core section 11. Higher order modes have multi-lobed spatial profiles while the fundamental mode is single-lobed. Higher order modes thus extend their fields more towards the thinner barrier layer region at the inner edge of the first core section 11, and therefore have a stronger coupling with the modes of the second core section 13. Since in the preferred embodiments the propagation constants $\beta_2$ are densely distributed, the modes of the second core section 13 couple also strongly with each other, which is called intra-core coupling. The associated power diffusion among the modes of the second core section 13 accompanied with mode-dependent inter-core coupling will lead to a smaller gain for the higher order modes of the first core section 11 compared to that experienced by the fundamental mode of the first core section 11. Hence, lasing or optical amplification in the fundamental mode of the first core section 11 will be favored.

Figure 13:
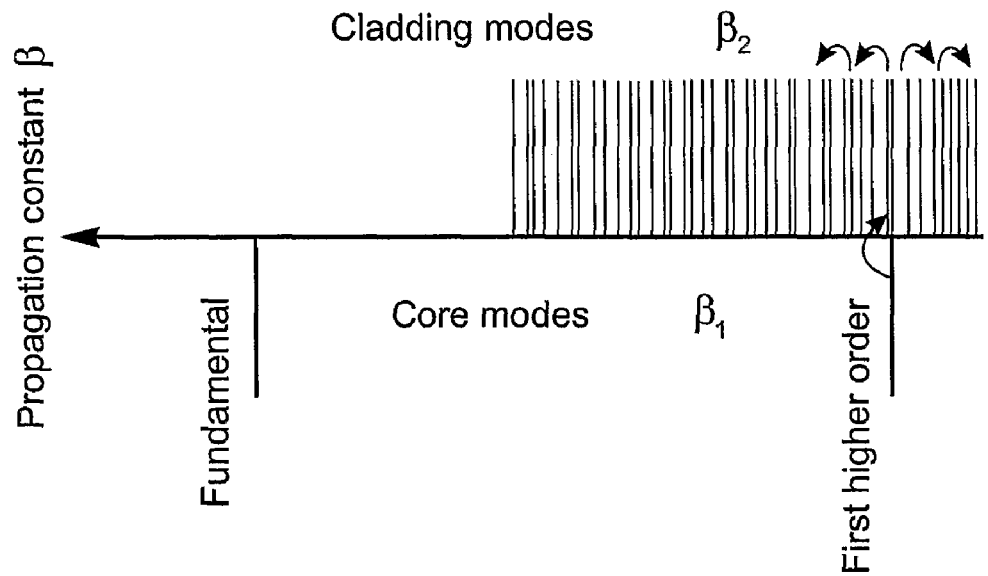
FIG. 13 depicts the same situation as in FIG. 12 except that no overlap exists for the fundamental mode of the first core section.
Figure 12:
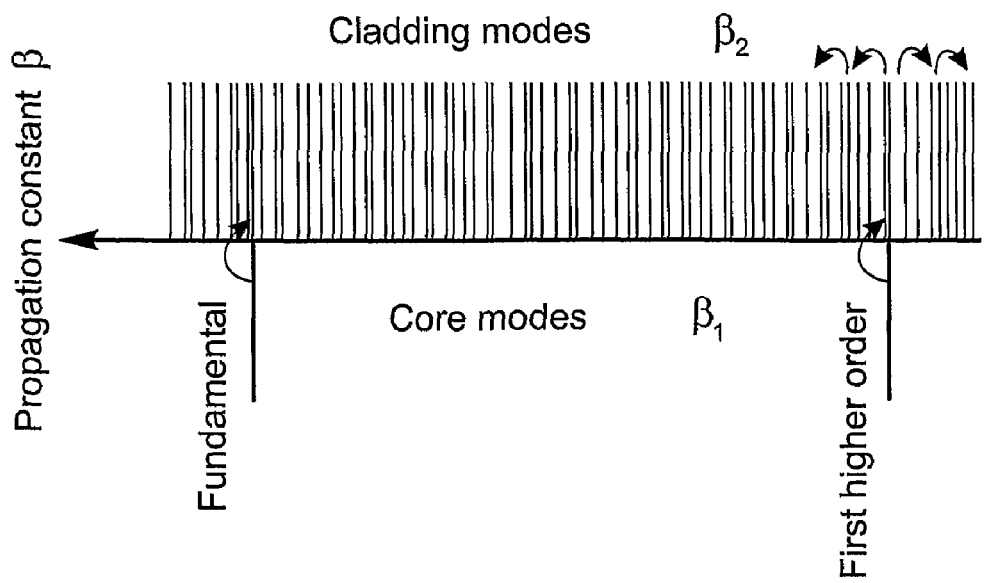
FIG. 12 depicts the propagation constants for the first and second core sections when there is a complete overlap of modes.

As already discussed, the fibers of the invention have an overlap between the propagation constants $\beta_1$ and $\beta_2$ of the waveguides or core sections. FIG. 12 shows the propagation constants for modes of the first core section 11 on the left and of the second core section 13 on the right of the vertical axis. As shown, said overlap of propagation constants exists for all modes of the first core section 11. By the term all here we mean the fundamental mode and at least a few potentially important higher order modes of the first core section. Due to the much larger area of the second core section, the propagation constants $\beta_2$ are much more densely spaced that the propagation constants $\beta_1$. Thus, for all the important modes of the first core section there is a possibility to couple to the modes of the second core section. The horizontal arrows indicate this coupling, and the vertical arrows between the modes of the second core section indicate coupling between the different modes of the second core section thus producing an efficient way to distribute optical power among the modes of the second core section 13 due to close spacing of their propagation constants. This means that power coupling from the second core section back into the first core section does not occur readily. Any optical power coupled from the first core section 11 into the second core section 13 is therefore permanently lost from the first core section as far as optical gain is concerned. Thus, said coupled power is equivalent to an optical loss for the first core section 11 although the power is not totally lost out of the fiber. In this invention we can therefore equivalently speak about coupling loss or reduction of gain due to coupling out of the first core section 11. FIG. 13 depicts the propagation constants for the two waveguides when there is no close overlap of propagation constants for the fundamental mode of the first core section 11, but said overlap exists for all other potentially important higher order modes of the first core section. In this case the possibility of coupling of the fundamental mode of the first core section 11 with the modes of the second core section 13 is less probable than for higher order modes of the first core section 11. However, for fibers having the modal diameter of the fundamental mode of the first core section of several tens of microns; the situation depicted in FIG. 13 may be difficult to achieve reproducibly in practice due to required strict control of the refractive index values in the fiber. However, this alternative would be the favorable for the operation of a laser or laser amplifier.

Figure 6B:
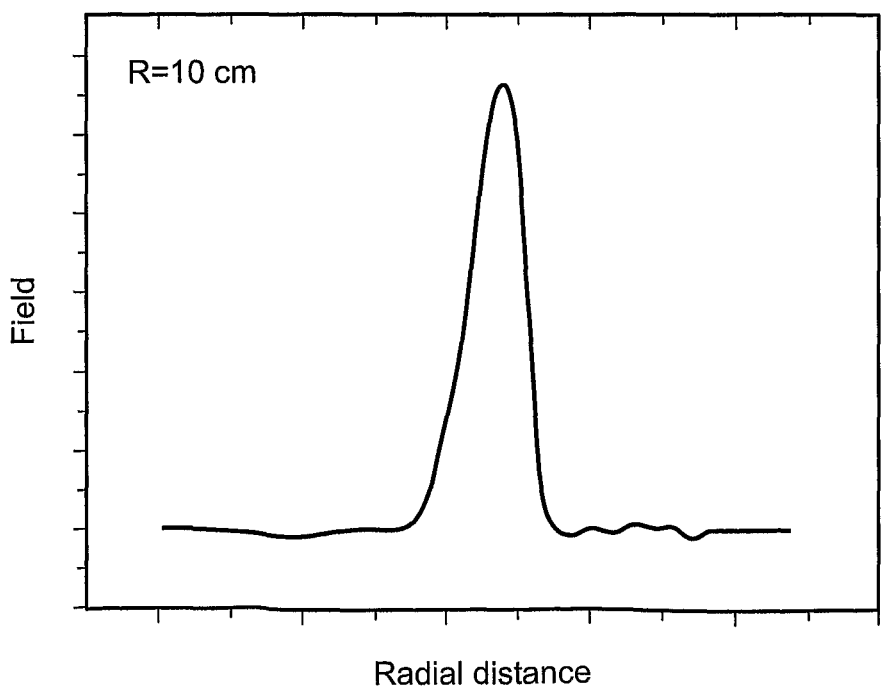

One can design different ways of minimizing the resonance effects discussed above for fibers having partly circular boundaries. In the second embodiment of the fiber 101 as shown in FIG. 6A, the shape of the third boundary 23 between the second core section and the cladding has been modified from circular into non-circular by incorporating a flat section into it. FIG. 6A also shows the contour plot for the field of the fundamental core mode at R=10 cm for the fiber 10'. The resonance has been greatly reduced compared to the case of circular symmetric fiber 10 of FIG. 4A. By choosing appropriate fiber geometry one is therefore able to reduce the resonance effects for the fundamental core mode. The origin of resonance lies in the boundary conditions for the Maxwell's equations that the fields must satisfy. For some fiber geometries of the fiber of the present invention these boundary conditions lead to stronger resonance effects than for other. FIG. 6B shows the line plot corresponding to FIG. 6A of the field along the radial direction. Further, in the fourth embodiment of the fiber 10, as shown in FIG. 8, the shape of the second boundary 22 between the barrier layer and the second core section has been modified from circular into non-circular by incorporating a flat section into it. One can also design different ways of minimizing the resonance effects discussed above for fibers having wholly circular boundaries. In this case the mentioned effect is reached by arranging the first core section and/or the barrier layer and/or the second core section asymmetrically, as shown in the third embodiment of FIG. 7, in the fifth embodiment of FIG. 9 and in the sixth embodiment of FIG. 10.

Figure 14:
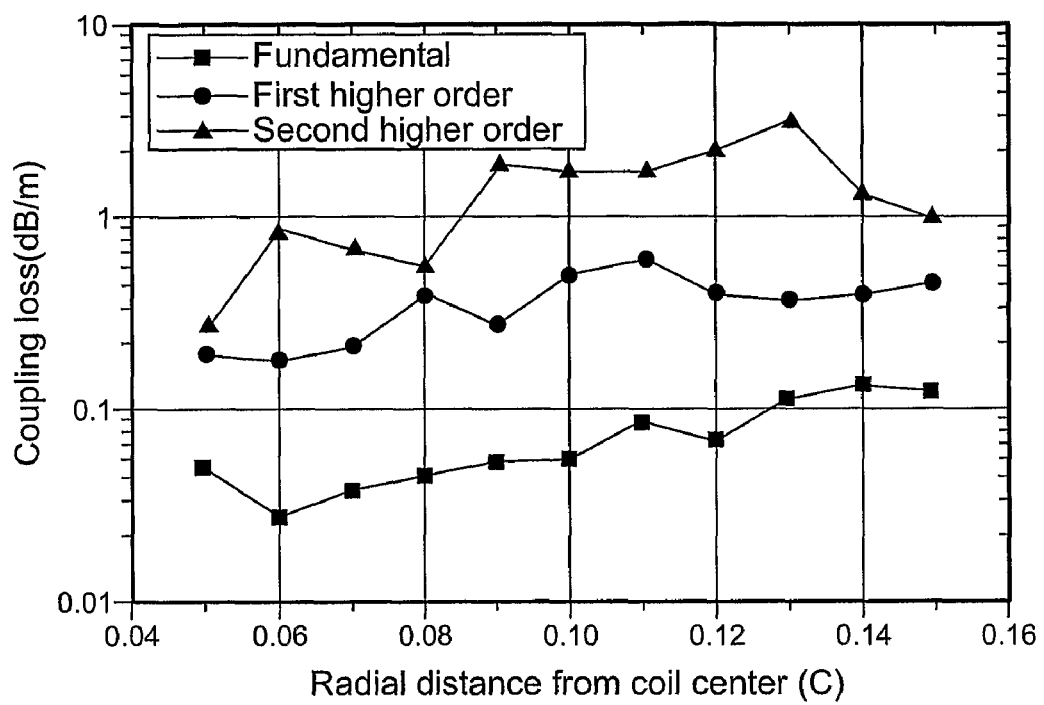
FIG. 14 depicts the coupling loss as a function of bending radius for the three lowest-order modes of the inner first core section in the case when the optical fiber has the geometry of the third embodiment as shown in FIG. 7, and when the outer second core section has an infinite outer diameter.

FIG. 14 shows the calculated values for the optical coupling loss between the modes of the first core section 11 and the second core section 13 for the fiber geometry of FIG. 7 except that the second core section 13 has been assumed to be of infinite cross sectional area. In the calculation the following parameters were used: diameter of the first core section 11 was 40 µm, diameter of the second core section 13 was 60 µm, center axis of the barrier layer 12 was offset from that of the first core section 11 by 5 µm. Refractive index values used in this calculation were $n_1$=1.452, $n_2$=1.453, and $n_3$=1.45. In FIG. 14 the coupling loss for the first core section has been plotted as a function of bending radius R, R being the distance from the axis of bending to the centerline L of the first core section 11. A calculation as shown gives a measure of the coupling strength between the two core sections, and gives an estimation on the coupling losses for the modes of the first core section 11 of a real fiber having finite extents. Hence, such a calculation can be utilized to design appropriate physical and geometrical parameters for the first core section 11, the barrier layer 12, and the second core section 13. As shown in FIG. 14, the coupling loss for the fundamental mode remains significantly lower than that of the next higher order mode around bending radius of 10 cm. When the bending radius is 5 cm or less the coupling loss even for the fundamental mode starts to increase. The same happens for large bending radii, where the bending induced index profile cannot sufficiently confine the mode at the inner edge of the first core section, i.e. the side adjacent to thin portion of the barrier layer.

In FIG. 15 an example of a multimode optical fiber amplifier apparatus according to the present embodiment is depicted. The optical fiber laser apparatus comprises a radiation source 60 such as a laser diode for optical excitation of the active dopant atoms of the first core section and the fiber 10 which is partly wound to form a coil 61 with radius R for gain discrimination purposes, as discussed before. In the case of fiber laser, no external signal is needed, since the seed for lasing is provided by spontaneous emission. The signal source 62 of radiation connected parallel with the pump source 60 of radiation is also shown forming an optical amplifier, in which the optical signal from the signal light source would be propagating in the first core section 11 of optical fiber 10.

The present invention can also be implemented as an optical fiber laser apparatus comprising a resonant cavity including an optical fiber 10. The optical fiber 10 has a doped first core section 11 and at least a second core section 13 surrounding the first core section 11. The first core section 11 has a first effective refractive index n1, and the second core section 13 has a third effective refractive index n3. The third effective refractive index n3 is equal or greater than the first effective refractive index n1. The fiber 10 also comprises a barrier layer 12 between the first core section 11 and the second, core section 13, the barrier layer 12 having a second refractive index n2, which is smaller than the refractive index n1 of the first core section 11. The apparatus also has a pump light source for excitation of the active atoms in the fiber gain medium, and means of extracting laser light out of said resonant cavity. The pump light is coupled into the composite fiber formed by the first core section 11 and at least the second core 13 by a coupling means.

It should be noted that according to the spirit of this invention the fiber geometry is not restricted to the cases presented in this text. For instance, the first core section may be non-circular instead of circular in shape. The same applies to other regions of the fiber. What is essential to the present invention is that the first core section of the fiber is doped with active atoms, and that another region—the second core section—is undoped by active atoms, and that there is an intermediate layer or layer structure—the barrier layer—that provides a controllable leakage path for the core modes into the second core section. It is further characteristic of the invention that the refractive indices of the first core section, barrier layer and second core section are chosen so that a strong coupling between the core modes and cladding nodes is possible, meaning that both the core and the cladding modes exhibit propagation constants that are close to each other. One can also express this so that both the core modes and the cladding modes occupy the same region of propagation constant space. This roughly means that the requirement $n_3 \geq n_1$ must be satisfied. This also means that strong coupling of power from a core mode into a cladding mode is possible, the coupling being controlled by the properties of the barrier layer. It is further characteristic to this invention that resonance effects occur in the coupling strength, and that these resonance effects can be controlled, for instance, by the bending radius of the fiber and the geometry of the fiber cross section in order to favor lasing of the fundamental mode against the higher order core modes. For large first core section diameters of several tens of microns it may not be possible to suppress lasing of all higher order core modes, but one should still be able to restrict lasing only to a few core modes resulting in a relatively high beam quality for the laser. As a further note, it should be understood that there may exist other material layers outside the cladding to serve other purposes than controlling the core modes, such as for optical pumping purposes.

Let us mention here a non-limiting example of the dimensions of the fiber 10 according to the present invention: The diameter of the first core section 11 is about 40 µm, the thickness of the barrier layer 12 is about 10 µm the diameter of the second core section 12 is about 200 µm. The differences between the refractive indices of the layers of this example embodiment are as follows:

first core section–barrier layer: $n_1 - n_2 = 2 \times 10^{-3}$, second core section–first core section: $n_3 - n_1 = 1 \times 10^{-3}$, first core section–cladding: $n_1 - n_4 = 5 \times 10^{-3}$.

It is obvious that the present invention is not limited solely to the above-presented embodiments, but it can be modified within the scope of the appended claims.

The invention claimed is:

1. An active multimode fiber for a gain medium in fiber lasers or fiber amplifiers, comprising a core region and a cladding region surrounding the core region, wherein
the core region consists of:
(a) a first core section doped with active atoms, and having a first effective refractive index ($n_1$);
(b) a second core section undoped with active atoms, surrounding the first core section, and having a third effective refractive index ($n_3$) that is equal or greater than said first effective refractive index ($n_1$); and
(c) a barrier layer between the first core section and the second core section, the barrier layer having a second refractive index ($n_2$) that is smaller than the first effective refractive index ($n_1$) of the first core section by an index difference ($\Delta n$), and a thickness (d2), and wherein
the cladding region surrounds the second core section and has a fourth refractive index ($n_4$) that is smaller than the first effective refractive index ($n_1$) thereby forming a refractive index step in a boundary, and wherein
the first effective refractive index ($n_1$) and the third effective refractive index ($n_3$) enable core modes with a first propagation constant ($\beta_1$) in the first core section, and cladding modes with a second propagation constant ($\beta_2$) in the second core section, the first propagation constant and the second propagation constant having values approaching each other, and wherein
the second core section has a cross-sectional area that is large enough to occupy a multitude of modes; whereupon
the index difference ($\Delta n$) and the thickness (d2) are such that a fundamental core mode couples less strongly with the cladding modes than higher order core modes.

2. An active multimode fiber according to claim 1, wherein the fourth refractive index ($n_4$) is smaller than the second refractive index ($n_2$).

3. An active multimode fiber according to claim 1, wherein the barrier layer is either eccentrically positioned between the first core section and the second core section and/or has an unsymmetrical cross section so that the barrier layer has a variable thickness (d2).

4. An active multimode fiber according to claim 3, wherein the barrier layer has a smallest thickness ($d2_{min}$) at one side of the first core section and a greatest thickness ($d2_{max}$) at the opposite side of the first core section, and wherein the smallest thickness and the greatest thickness are in a bending plane (P) extending through the longitudinal center line (L) of the first core section.

5. An active multimode fiber according to claim 1, wherein the first core section has a circular first boundary, and wherein the barrier layer has a second boundary that is either circular or has a flat side extending in a longitudinal direction of the fiber.

6. An active multimode fiber according to claim 4, wherein the second core section has a third boundary which has a greater first width and a smaller first width, wherein the greater first width is perpendicular to the bending plane.

7. An active multimode fiber according to claim 4, wherein the cladding has a fourth boundary which has a greater second width and a smaller second width, wherein the greater second width is perpendicular to the bending plane.

8. An active multimode fiber according to claim 1, wherein the first core section has a diameter (d1) between 10 µm and 100 µm.

9. An active multimode fiber according to claim 1, wherein said barrier layer has a thickness (d2) between 3 µm and 50 µm.

10. An active multimode fiber according to claim 1, wherein the fiber has a longitudinal center line (L) with a bending radius (R).

11. An active multimode fiber according to claim 10, wherein the bending radius is between 3 cm and 50 cm.

12. An active multimode fiber according to claim 3, wherein the fiber has a longitudinal center line (L) and a bending radius (R) which is in a bending plane (P) extending through the longitudinal center line (L).

13. An optical fiber laser apparatus comprising:
a resonant cavity including a multimode optical fiber,
a pump source of radiation for excitation of active atoms within a fiber gain medium, and
means for extracting laser light out of the resonant cavity, wherein
the multimode optical fiber comprises a core region and a cladding region, wherein the core region of the multimode optical fiber consists of:
(a) a first core section doped with active atoms, and having a first effective refractive index ($n_1$);
(b) a second core section undoped with active atoms, surrounding the first core section, and having a third effective refractive index ($n_3$) that is equal or greater than said first effective refractive index ($n_1$); and (c) a barrier layer between the first core section and the second core section, and wherein the cladding region surrounds the second core section and has a fourth refractive index ($n_4$) that is smaller than the first effective refractive index ($n_1$) thereby forming a refractive index step in a boundary, and wherein the second core section has a cross-sectional area that is sufficiently large to occupy a multitude of modes therein; and wherein the barrier layer between the first and second core sections has a thickness ($d2$) and a second refractive index ($n_2$), which is smaller than the first effective refractive index ($n_1$) of the first core section, and wherein a less strong coupling between a desired fundamental core mode and undesired higher order core modes is achieved by:

(i) the thickness ($d2$) and an index difference ($\Delta n$) between the second refractive index ($n_2$) and the first effective refractive index ($n_1$) being such that a fundamental core mode couples less strongly with the cladding modes than do higher order core modes;

(ii) core modes with a first propagation constant ($\beta_1$) being enabled in the first core section for transmission of one portion of the total power, and cladding modes with a second propagation constant ($\beta_2$) being enabled in the second core section for transmission of another portion of the total power; and (iii) the core modes and the cladding modes occupying the same region of propagation constant space.

14. An apparatus according to claim 13, wherein the fourth refractive index ($n_4$) of the fiber is smaller than the second refractive index ($n_2$).

15. An apparatus according to claim 13, wherein the barrier layer is either eccentrically positioned between the first core section and the second core section and/or has an unsymmetrical cross section so that the barrier layer has a variable thickness ($d2$).

16. An apparatus according to claim 15, wherein the barrier layer has a smallest thickness ($d2_{min}$) at one side of the first core section and a greatest thickness ($d2_{max}$) at the opposite side of the first core section, and wherein the smallest thickness and the greatest thickness are in a bending plane (P) extending through the longitudinal center line (L) of the first core section.

17. An apparatus according to claim 13, wherein the first core section has a circular first boundary, and wherein the barrier layer has a second boundary that is either circular or has a flat side extending in a longitudinal direction of the fiber.

18. An apparatus according to claim 16, wherein the second core section has a third boundary, which has a greater first width (W1a) and a smaller first width (W1b), wherein the greater first width is perpendicular to said bending plane (P).

19. An apparatus according to claim 16, wherein the cladding has a fourth boundary, which has a greater second width (W2a) and a smaller second width (W2b), wherein the greater second width is perpendicular to the bending plane (P).

20. An apparatus according to claim 13, wherein the first core section of the fiber has a diameter (d1) between 10 μm and 100 μm.

21. An apparatus according to claim 13, wherein the barrier layer of the fiber has a thickness (d2) between 3 μm and 50 μm.

22. An apparatus according to claim 13, wherein the fiber is bent on a coil having a predetermined radius (R).

23. An apparatus according to claim 22, wherein the radius (R) of the coil is between 3 cm and 50 cm.

24. An apparatus according to claim 22, wherein the radius (R) of the coil is predetermined to have such a value that fundamental core mode is non-resonant in the optical fiber to incur gain discrimination between fundamental and higher order core modes.

25. An apparatus according to claim 13, wherein the active atoms in the first core section are from at least one dopant selected from the group consisting of erbium (Er), neodymium (Nd), and ytterbium (Yb).

26. An apparatus according to claim 13, wherein the apparatus further comprises a signal source of radiation connected parallel with the pump source of radiation.

27. An apparatus according to claim 13, wherein the first core section of the fiber has a diameter (d1) between 30 μm and 60 μm.

28. An apparatus according to claim 13, wherein the barrier layer of the fiber has a thickness (d2) between 5 μm and 20 μm.

29. An apparatus according to claim 22, wherein the radius (R) of the coil is between 5 cm and 20 cm.

30. An active multimode fiber according to claim 1, wherein the said first core section has a diameter (d1) between 30 μm and 60 μm.

31. An active multimode fiber according to claim 1, wherein the barrier layer has a thickness (d2) between 5 μm and 20 μm.

32. An active multimode fiber according to claim 10, wherein the said bending radius is between 5 cm and 20 cm.

33. An active multimode fiber for a gain medium in fiber lasers or fiber amplifiers, comprising a core region and a cladding region surrounding the core region, wherein the core region consists of:

(a) a first core section doped with active atoms, and having a first effective refractive index ($n_1$);

(b) a second core section undoped with active atoms, surrounding the first core section, and having a third effective refractive index ($n_3$) that is equal or greater than said first effective refractive index ($n_1$); and (c) a barrier layer which consists of two or more barrier strata between the first core section and the second core section, the barrier layer having a second refractive index ($n_2$) that is smaller than the first effective refractive index ($n_1$) of the first core section by an index difference ($\Delta n$), and a thickness ($d2$), and wherein the cladding region surrounds the second core section and has a fourth refractive index ($n_4$) that is smaller than the first effective refractive index ($n_1$) thereby forming a refractive index step in a boundary, and wherein the first effective refractive index ($n_1$) and the third effective refractive index ($n_3$) enable core modes with a first propagation constant ($\beta_1$) in the first core section, and cladding modes with a second propagation constant ($\beta_2$) in the second core section, the first propagation constant and the second propagation constant having values approaching each other, and wherein the second core section has a cross-sectional area that is large enough to occupy a multitude of modes; whereupon the index difference ($\Delta n$) and the thickness ($d2$) are such that a fundamental core mode couples less strongly with the cladding modes than higher order core modes.

34. An active multimode fiber according to claim 33, wherein at least two of said two or more barrier strata have different second refractive indices ($n_{2A}$, $n_{2B}$).

35. An optical fiber laser apparatus comprising:

a resonant cavity including a multimode optical fiber, a pump source of radiation for excitation of active atoms within a fiber gain medium, and means for extracting laser light out of the resonant cavity, wherein the multimode optical fiber comprises a core region and a cladding region, wherein the core region of the multimode optical fiber consists of:
  - (a) a first core section doped with active atoms, and having a first effective refractive index ($n_1$);
  - (b) a second core section undoped with active atoms, surrounding the first core section, and having a third effective refractive index ($n_3$) that is equal or greater than said first effective refractive index ($n_1$); and
  - (c) a barrier layer which consists of two or more barrier strata between the first core section and the second core section, and wherein the cladding region surrounds the second core section and has a fourth refractive index ($n_4$) that is smaller than the first effective refractive index ($n_1$) thereby forming a refractive index step in a boundary, and wherein the second core section has a cross-sectional area that is sufficiently large to occupy a multitude of modes therein; and wherein the barrier layer between the first and second core sections has a thickness (d2) and a second refractive index ($n_2$), which is smaller than the first effective refractive index ($n_1$) of the first core section, and wherein a less strong coupling between a desired fundamental core mode and undesired higher order core modes is achieved by:
  - (i) the thickness (d2) and an index difference ($\Delta n$) between the second refractive index ($n_2$) and the first effective refractive index ($n_1$) being such that a fundamental core mode couples less strongly with the cladding modes than do higher order core modes;
  - (ii) core modes with a first propagation constant ($\beta_1$) being enabled in the first core section for transmission of one portion of the total power, and cladding modes with a second propagation constant ($\beta_2$) being enabled in the second core section for transmission of another portion of the total power; and
  - (iii) the core modes and the cladding modes occupying the same region of propagation constant space.

36. An apparatus according to claim 35, wherein the fourth refractive index ($n_4$) of the fiber is smaller than the second refractive index ($n_2$).

* * * * *